United States Patent
Willenz

[19]

[11] Patent Number: 5,841,722
[45] Date of Patent: Nov. 24, 1998

[54] FIRST-IN, FIRST-OUT (FIFO) BUFFER

[75] Inventor: Avigdor Willenz, Kamoon, Israel

[73] Assignee: Galileo Technologies Ltd., Karmiel, Israel

[21] Appl. No.: 799,136

[22] Filed: Feb. 13, 1997

[30] Foreign Application Priority Data

Feb. 14, 1996 [IL] Israel .......................................... 117134

[51] Int. Cl.$^6$ .................................................. G11C 7/00
[52] U.S. Cl. ..................................... 365/221; 365/189.05
[58] Field of Search ................................ 365/189.05, 221

[56] References Cited

U.S. PATENT DOCUMENTS 4,833,655  5/1989  Wolf et al. ............................... 365/221
5,331,598  7/1994  Matsushita et al. ..................... 365/221
5,513,145  4/1996  Hattori et al. ........................... 365/221

Primary Examiner—David C. Nelms
Assistant Examiner—Michael T. Tran
Attorney, Agent, or Firm—Darby & Darby

[57] ABSTRACT

A variable sized FIFO buffer whose size changes in accordance with how much data is present to be passed between the two systems is provided.

One embodiment of the FIFO buffer includes at least one lower FIFO, at least one upper FIFO, a RAM and a controller. The upper FIFO buffer receives data from a first system and the lower FIFO buffer writes data to a second system. The RAM is utilized when data can no longer flow between the upper and lower FIFO buffers, due to the lower FIFO buffer being temporarily full.

2 Claims, 2 Drawing Sheets

FIRST-IN, FIRST-OUT (FIFO) BUFFER

FIELD OF THE INVENTION

The present invention relates to first-in, first-out (FIFO) buffers generally.

BACKGROUND OF THE INVENTION

First-in, first-out (FIFO) buffers are utilized to buffer between a transferring system and a receiving system and are well-known in the art. The transferring system writes data into a FIFO buffer and the receiving system reads data out in the order that it was written; hence the name "first-in, first-out".

FIFO buffers are fast memory elements which come in many sizes. They can have 64–65,536 entries of 1 to 36 bits wide. Typically, though, larger sizes are not produced since large FIFO buffers require a large die size which is too expensive to manufacture.

SUMMARY OF THE PRESENT INVENTION

It is an object of the present invention to provide an improved FIFO buffer for buffering data between two systems.

There is therefore provided, in accordance with a preferred embodiment of the present invention, a variable sized FIFO buffer whose size changes in accordance with how much data is present to be passed between the two systems.

There is also provided, in accordance with a preferred embodiment of the present invention, a FIFO buffer which combines FIFO buffers and a random access memory (RAM) element. RAMs are standard, very common, memory elements which are typically more store more, in less space (i.e. higher density technology) than FIFOs.

The FIFO buffer of the present invention includes at least one lower FIFO, at least one upper FIFO, a RAM and a controller. The upper FIFO buffer receives data from a first system. The lower FIFO buffer writes data to a second system. The RAM is utilized only when data can no longer flow between the upper and lower FIFO buffers, due to the lower FIFO buffer being temporarily full. It is noted that the FIFO buffers are dual port buffers and the RAM is a single port buffer.

The controller writes data from the upper FIFO buffer to the lower FIFO buffer when the lower FIFO is not full and into the RAM when the lower FIFO is full. The controller reads the data from the RAM into the lower FIFO buffer when there is data in the RAM and the lower FIFO buffer is no longer full.

In accordance with a preferred embodiment of the present invention, data is written to and read from the RAM in blocks. Thus, the controller collects blocks of words from the upper FIFO buffer (for writing into the RAM) and separates the block into its component words for writing to the lower FIFO buffer.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
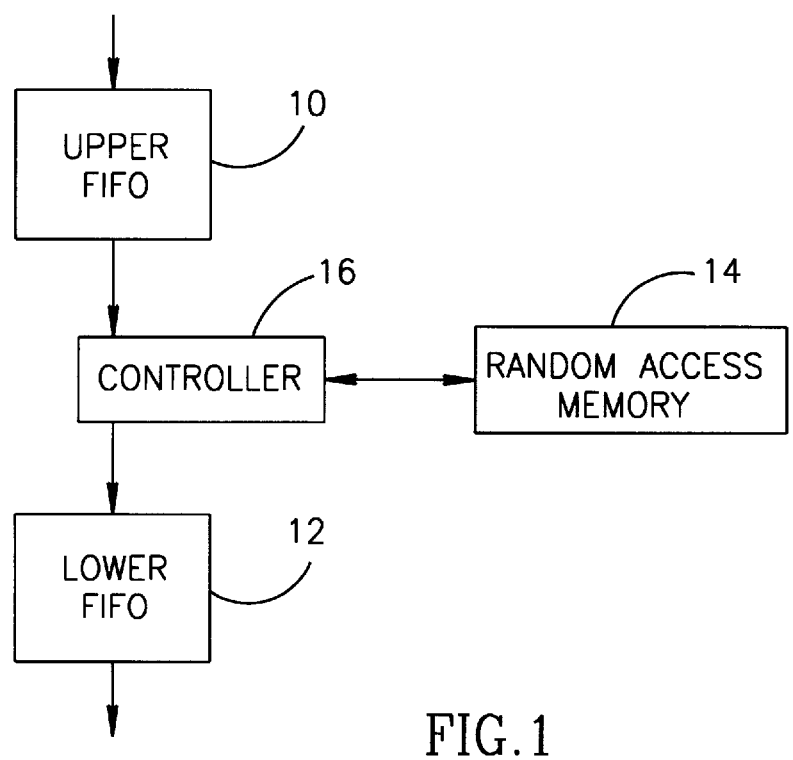
FIG. 1 is a schematic illustration of a variable sized FIFO, constructed and operative in accordance with a preferred embodiment of the present invention.
Figure 2:
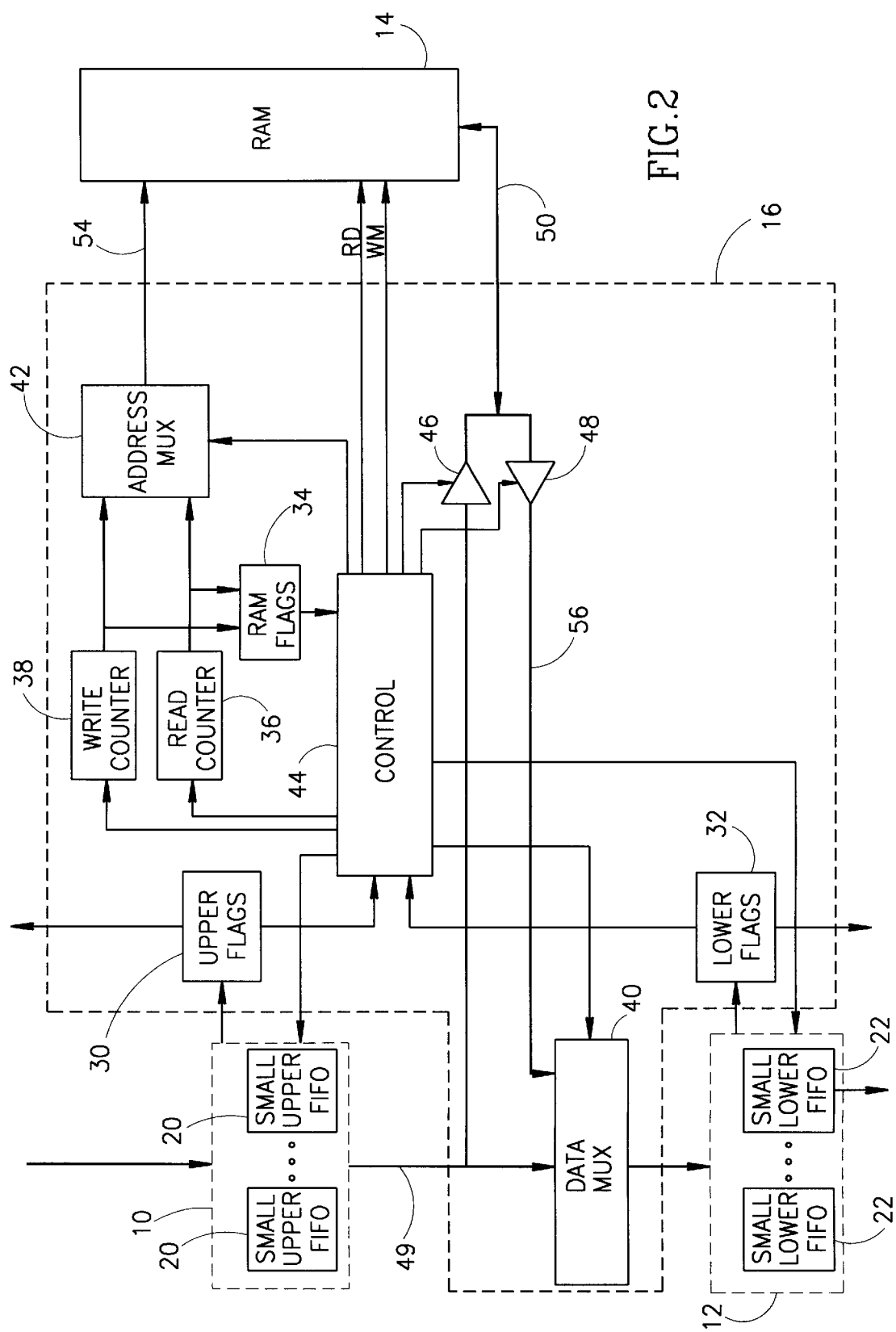
FIG. 2 is a more detailed illustration of the variable sized FIFO of FIG. 1.

Reference is now made to FIGS. 1 and 2 which illustrate the variable sized first-in, first-out (FIFO) buffer of the present invention. The variable sized FIFO of the present invention comprises an upper FIFO buffer 10, a lower FIFO buffer 12, a random access memory (RAM) element 14 and a controller 16. Each FIFO buffer operates as a regular FIFO buffer with read and write pointers indicating the locations therein from which to read and into which to write, respectively. Furthermore, as indicated by the arrows in FIG. 1, each FIFO buffer is a dual port buffer (having separate input and output arrows) while the RAM 14 is a single port buffer (having a single, double headed input/output arrow).

In accordance with the present invention, the controller 16 has two modes of operation. In the first mode, when the lower FIFO buffer 12 is not full, the controller 16 propagates data directly from the upper FIFO buffer 10 to the lower FIFO buffer 12. Once the lower FIFO buffer 12 is full, the controller 16 directs the data propagated through the upper FIFO buffer 10 to the RAM 14. To optimize bandwidth, data is written to RAM 14 in blocks, typically of 8 bytes or words.

Whenever there is data within the RAM 14 and lower FIFO buffer 12 is less than full, controller 16 writes into the lower FIFO buffer 12 from the RAM 14 in blocks. Whenever all of the data within RAM 14 has been read out, controller 16 returns to propagating data directly from the upper FIFO buffer 10 to the lower FIFO buffer 12.

It will be appreciated that the RAM 14 provides the variable size and is utilized only when data can no longer flow between the upper and lower FIFO buffers, due to the lower FIFO buffer being temporarily full.

As can be seen, the present invention combines FIFO buffers for receiving and sending data with a RAM memory element. Since RAMs are extremely common, relatively inexpensive and are relatively high density memory elements, the present invention provides large sized FIFO buffers without the attendant cost. Furthermore, the RAM provides a variable sized increase and thus, the FIFO buffer of the present invention can be utilized in systems whose data rates change often. Due to its flexible size, the FIFO buffer of the present invention can be utilized in many different systems with vastly different data rates.

FIG. 2 details the variable sized first-in, first-out (FIFO) buffer of the present invention. In FIG. 2, double lines indicate the flow of data and single lines indicate the flow of control signals.

As illustrated in FIG. 2, the lower and upper FIFO buffers 10 and 12, respectively, are each comprised of a plurality N of small FIFO buffers 20 and 22, respectively. When data is to be transferred to the RAM 14, the controller 16 creates a block of data by reading several pieces of data (i.e. a word or words) from each of the small upper FIFO buffers 20. The controller 16 then transfers the block into the memory element 14. Similarly, when data is to be transferred from the RAM 14, the controller 16 reads a block of data from the memory element 14 and then provides the separate words within the block to the small lower FIFO buffers 20.

Controller 16 typically includes three flag units 30, 32 and 34 which, respectively, measure the fullness of the upper FIFO 10, the lower FIFO 12 and the RAM 14, read and write counters 36 and 38, respectively, a data multiplexer (MUX) 40, an address MUX 42, a control unit 44, a block combiner 46 and a block separator 48.

Upper flag unit 30 and lower flag unit 32 are the standard fullness flag units which form part of every FIFO buffer system. They will therefore not be described in detail. The flag units 30 and 32 provide indications (full, empty and not-full) when their respective FIFOs are full and when they are not. Similarly, RAM flag unit 34 indicates when data is present, or not, in the RAM 14. Control unit 44 compares the fullness indications of the three flag units 30, 32 and 34 to determine how to direct the data present in the FIFOs 10 and 12 and in the RAM 14. When the lower flag unit 32 indicates non-fullness and the RAM flag unit 34 indicates emptiness, then the control unit 44 switches the data MUX 40, which controls the input to the lower FIFO 12, to a first mode, in which MUX 40 receives data, along data line 49, from the upper FIFO 10.

When the lower FIFO 12 reaches a full state (i.e. the indication from the lower flag unit 32 changes from a non-full indication to a full indication), control unit 44 indicates to the block combiner 46 to begin collecting the data flowing from the upper FIFO 10 into blocks. Typically, a block is eight words although other sized blocks can also be utilized. The size of the block is a function of the speed of the RAM 14. If, after the block has been created, the lower flag unit 32 still indicates fullness, the control unit 44 will initiate the writing of the block from block combiner 46 into RAM 14. This involves incrementing the write counter 38 to indicate the new address at which to write into the RAM 14, indicating to address MUX 42 to provide the output of the write counter 38 to the RAM 14 and providing a write (WR) signal to the RAM 14 (so that the RAM will perform the write operation).

Since RAM 14 acts as a first-in, first-out buffer, albeit with a single shared port, the blocks of words are sequentially written to it and are sequentially read out from it. It will be appreciated that the address MUX 42 controls the address line, labeled 54, of the RAM 14. For reading, the address MUX 42 provides the output of the read counter 36 to RAM 14. For writing, the address MUX 42 provides the output of the write counter 38 to RAM 14. The control unit 44 provides the associated read (RD) or write (WR) signal, causing the RAM 14 to read or write the block on the incoming data line, labeled 50, to the address provided on the address line 54.

The incremented value of the write counter 38 is also provided to the RAM flag unit 34. Since RAM flag unit 34 also receives the current value of the read counter 36, RAM flag unit 34 determines, from the difference of the read and write counters, the fullness state of the RAM 14.

When the lower FIFO 12 becomes available to receive data (i.e. the indication from the lower flag unit 32 changes from a full indication to a non-full indication), if, at the same time, the RAM flag unit 34 indicates that there is data stored in RAM 14, then control unit 44 reads a block from the RAM 14 to block separator 48 and indicates to data MUX 40 to receive data along data line 56 (from RAM 14). The read operation involves incrementing the read counter 36, indicating to address MUX 42 to provide the output of the read counter 36 along address line 54 to the RAM 14 and providing a read (RD) signal to the RAM 14 (so that the RAM will perform the read operation).

The block separator 48 receives the block along data line 50 and separates the words of the block, providing them along data line 56 to data MUX 40. Data MUX 40, in turn, provides the words to the separate small lower FIFOs 22.

If, when the lower FIFO 12 becomes available to receive data, the RAM flag unit 34 indicates that no data is stored in RAM 14, then control unit 44 indicates to the data MUX 40 to receive data directly, along data line 49, from the upper FIFO 10, as described hereinabove.

It will be appreciated that the read and write counters 36 and 38, respectively, are large enough to count through the entire contents of the RAM 14. As is known in the art of FIFO counters, when counters 36 and 38 reach the maximum count value, they begin again at 0. RAM flag unit 34 determines the empty state of the RAM 14 as the state when the read and write counters have the same value. The write counter 38 is never allowed to "pass" the read counter 36.

It will be appreciated by skilled in the art that the present invention is not limited to what has been particularly shown and described hereinabove. Rather the scope of the present invention is defined only by the claims which follow:

I claim:

1. A variable sized, first-in, first-put (FIFO) buffer to be placed between a first and a second system, the FIFO buffer comprising:

a least one upper FIFO buffer for receiving data from said first system;

at least one lower FIFO buffer for writing data to said second system;

a random access memory element for receiving data from said at least one upper FIFO buffer when said at least one lower FIFO buffer is temporarily full; and a controller for writing data from said at least one upper FIFO buffer to said at least one lower FIFO buffer when said at least one lower FIFO buffer is not full and into random access memory element when said at least one lower FIFO buffer is full and for reading data from said random access memory element into said at least one lower FIFO buffer when there is data in said random access memory element and said at least one lower FIFO buffer is no longer full wherein said controller includes a block generator for combining data from said at least one upper FIFO buffer into blocks for writing into said random access memory element and a block separator for separating blocks of data read from said random access memory element into separate words and for writing said separate words into said at least one lower FIFO buffer.

2. A buffering element to be placed between a first and a second system, the buffering element comprising:

a random access memory element for storing data in a first-in, first-out manner;

at least one upper FIFO buffer connected to said first system and connectable to said random access memory element;

at least one lower FIFO buffer connected to said second system and connectable at least to said random access memory element; and a controller for directing data from sold first system to said second system through said upper and lower FIFO elements and said random access memory element and including a control unit for writing data from said at least one upper FIFO buffer to said at least one lower FIFO buffer when said at least one lower FIFO buffer is not full and into said random access memory element when said at least one lower FIFO buffer is full and for reading data from said random access memory element into said at least one lower FIFO buffer when there is data in said random access memory element and said at least one lower FIFO buffer is no longer full, wherein said controller includes a block generator for combining data from said at least one upper FIFO buffer into blocks for writing into said random access memory element and a block separator for separating blocks of data read from said random access memory element into separate words and for writing said separate words into said at least one lower FIFO buffer.

* * * * *